(12) United States Patent
O'Keeffe et al.

(10) Patent No.: US 6,785,286 B1
(45) Date of Patent: Aug. 31, 2004

(54) PORT MIRRORING ACROSS A TRUNKED STACK OF MULTI-PORT COMMUNICATION DEVICES

(75) Inventors: Daniel M O'Keeffe, Ballyhooly (IE); David J Law, Kempston (GB); Paul J Moran, Hemel Hempstead (GB); Neil J Clifford, Dublin (IE)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/369,324

(22) Filed: Aug. 6, 1999

(30) Foreign Application Priority Data

May 25, 1999 (GB) .............................................. 9911987

(51) Int. Cl.[7] .............................................. H04L 12/28
(52) U.S. Cl. ........................ 370/397; 370/390; 370/229
(58) Field of Search ................................ 370/432, 389, 370/390, 392, 394, 428, 429, 396, 397

(56) References Cited

U.S. PATENT DOCUMENTS

| | | | |
|---|---|---|---|
| 5,909,438 A | * 6/1999 | Melden et al. | 370/388 |
| 6,016,310 A | * 1/2000 | Muller et al. | 370/255 |
| 6,141,355 A | * 10/2000 | Palmer et al. | 370/235 |
| 6,304,690 B1 | * 10/2001 | Day | 385/134 |
| 6,430,180 B1 | * 8/2002 | Bohm et al. | 370/369 |

FOREIGN PATENT DOCUMENTS

| | | |
|---|---|---|
| EP | 0841832 A2 | 5/1998 |
| GB | 2330741 A | 4/1999 |
| GB | 2333428 A | 7/1999 |
| GB | 2333429 A | 7/1999 |
| GB | 2334863 A | 9/1999 |
| WO | WO 95/03659 | 2/1995 |

* cited by examiner

*Primary Examiner*—Steven Nguyen
*Assistant Examiner*—Thien Tran
(74) *Attorney, Agent, or Firm*—Nixon & Vanderhye PC

(57) ABSTRACT

A stackable multi-port communication device for a packet-based data communication system, having a multiplicity of physical ports for the reception and dispatch of data in the form of packets, includes switch logic for selecting for a packet at least one destination selected from a multiplicity of ports which include a logical port common to a specified group of said physical ports. A cascade trunk logic, coupled to the switch logic, is used for determining, for the dispatch of a packet directed to said logical port, a selected port of said group of said physical ports; and a remote monitoring logic is used for forwarding a copy of the packet. The remote monitoring logic stores an indication of all the physical ports on the unit from which the copy may be forwarded by the remote monitoring logic and prevents the forwarding of the copy of the packet to any physical port which corresponds to the port selected by the cascade logic for the dispatch of said packet, whereby a packet which is forwarded from any of the specified group of physical ports is not duplicated by the remote monitoring logic.

13 Claims, 5 Drawing Sheets

PORT MIRRORING ACROSS A TRUNKED STACK OF MULTI-PORT COMMUNICATION DEVICES

FIELD OF THE INVENTION

The invention relates to the control of the operation of multi-port communication devices intended for in packet-based data communication systems such as the Ethernet. More particularly it relates to the inhibition of duplication of packet flow when port mirroring is provided for a stack of multi-port communication devices coupled by a trunked cascade.

BACKGROUND TO THE INVENTION

It is convenient to connect multi-port communication device such as repeaters, bridges, switches and the like so that externally they appear as a single logical entity. As a practical matter devices are made with a limited number of ports and the connection of a multiplicity of units together in a cascade, wherein each of the units has at least one port connected to a port of each other unit in the stack, provides a convenient way of producing a device with a greater number of ports. However, the provision of a cascade connection makes certain network functions more complex, as is exemplified below.

An important technique in network management is known as 'port mirroring', which is a desirable feature for any multi-port communication device. The ability of a device to support mirroring means that it can copy all data packets sent or received on one particular port to another port. The device needs to be configured to determine which port should be a 'study' port and which port is to be the 'copy' port to which a copy of all packets seen on the study port are sent The copy port is also known as the 'roving analysis port' (RAP port)

Trunking is another desirable feature for multi-port communication devices. Devices which are connected together by a single physical link may suffer from insufficiency of bandwidth or information capacity owing to the volume of traffic flowing between the two devices. Trunking of ports helps alleviate this problem because it allows physical ports to be grouped together so that they appear as a single logical port. Once the trunk has been created, it is represented internally in the switch by a single port number known as the 'master' or 'bridge' port. Packets which are destined for a remote device that is linked via a trunk are directed to the bridge port of that trunk and simple low level circuitry decides, for example by means of hashing algorithm, which physical port of the trunk should be used for forwarding the packet to the remote device.

The roving analysis port operates at a physical port level in that the RAP port identifies a single physical port rather than a logical port. The RAP logic operates at a physical port level so that it can 'study' physical ports as opposed to logical ports. To allow this logic to study at the physical layer provides the ability to study an individual port of a trunk. To study at the logical level would permit the study of the single logical port that represents the trunk and all the traffic of the trunk would be studied. To study a physical port of a trunk is more desirable because this feature can be used to debug an operational fault in relation to a particular port.

This creates a problem if port mirroring is to be supported across a stack of units that are linked together by a trunked cascade. If a packet which is to be forwarded down the cascade is also to be sent to the RAP port then there is a danger of packet duplication.

If the RAP port is not on the same device, then the cascade must be identified as the RAP port on this unit, as the cascade will take a packet to the unit that actually contains the RAP port. The cascade port chosen to identify the RAP port would be one of the physical ports of the trunked cascade. In this example, let the RAP port be identified as the logical port (bridge port) of the trunk Since the cascade trunking logic is at the logical level, the packet will pass through it before it goes to the physical layer's RMON logic. If the switching logic sends the packet to the cascade, then it will be directed to the logical port of the cascade. The hashing algorithm will then either allow the packet to go out this logical port or will redirect it to the other physical port of the Trunk. In the former case, the port mask that is sent to the RAP logic will have the corresponding bit for the logical port set If the RAP logic decides to study the packet and hence send the packet to the RAP port, it will see by means of the port mask that the packet is already going to the RAP port and so does not need to forward the packet to the RAP port itself. The RAP port in this unit was previously defined as the logical port of the cascade trunk. Accordingly, if the hashing algorithm selects the other physical port of the cascade, the mask that is sent to the RAP logic will have this bit set and not the bit of the logical port of the cascade. When the RAP logic decides to study a packet and send it to the RAP port, it will check if the bit for the RAP port is set in the mask (in this case it will not be set) and so will send the packet to the RAP port (logical port of the cascade). Now the bits for the logical port of the cascade and the other physical port of the cascade are set in the port mask and so the packet is sent down the cascade twice.

A second difficulty arises for units in a stack that do not contain the roving analysis port. These other units are configured to identify the RAP port as one of the physical ports of the cascade as this port will take a packet to the unit that actually contains the RAP port. Any packet which it receives and which are tagged for RMON analysis will be sent out of its designated RAP unless it received those packets on its RAP port. When the cascade is trunked it may receive a tagged packet on a different cascade port to its RAP port and so will attempt to forward the packet out on to the cascade again.

SUMMARY OF THE INVENTION

The present invention is particularly intended to avoid duplication of packets in the circumstances indicated in the foregoing and similar circumstances, i.e. to permit the mirroring of a port on one unit of a stack with a port on another unit when those units are connected by a trunked cascade, namely a manifold connection in which two or more ports of one unit are each connected to a respective port of the other unit, by preventing the dispatch down the cascade of both a packet and a copy. This is achieved by employing a mask register to detect whether a packet has already been sent down one of the cascade ports or has been received from a cascade trunk port.

The invention will be more particularly explained with reference to the accompanying drawings.

DETAILED DESCRIPTION OF A SPECIFIC EXAMPLE

Figure 1:
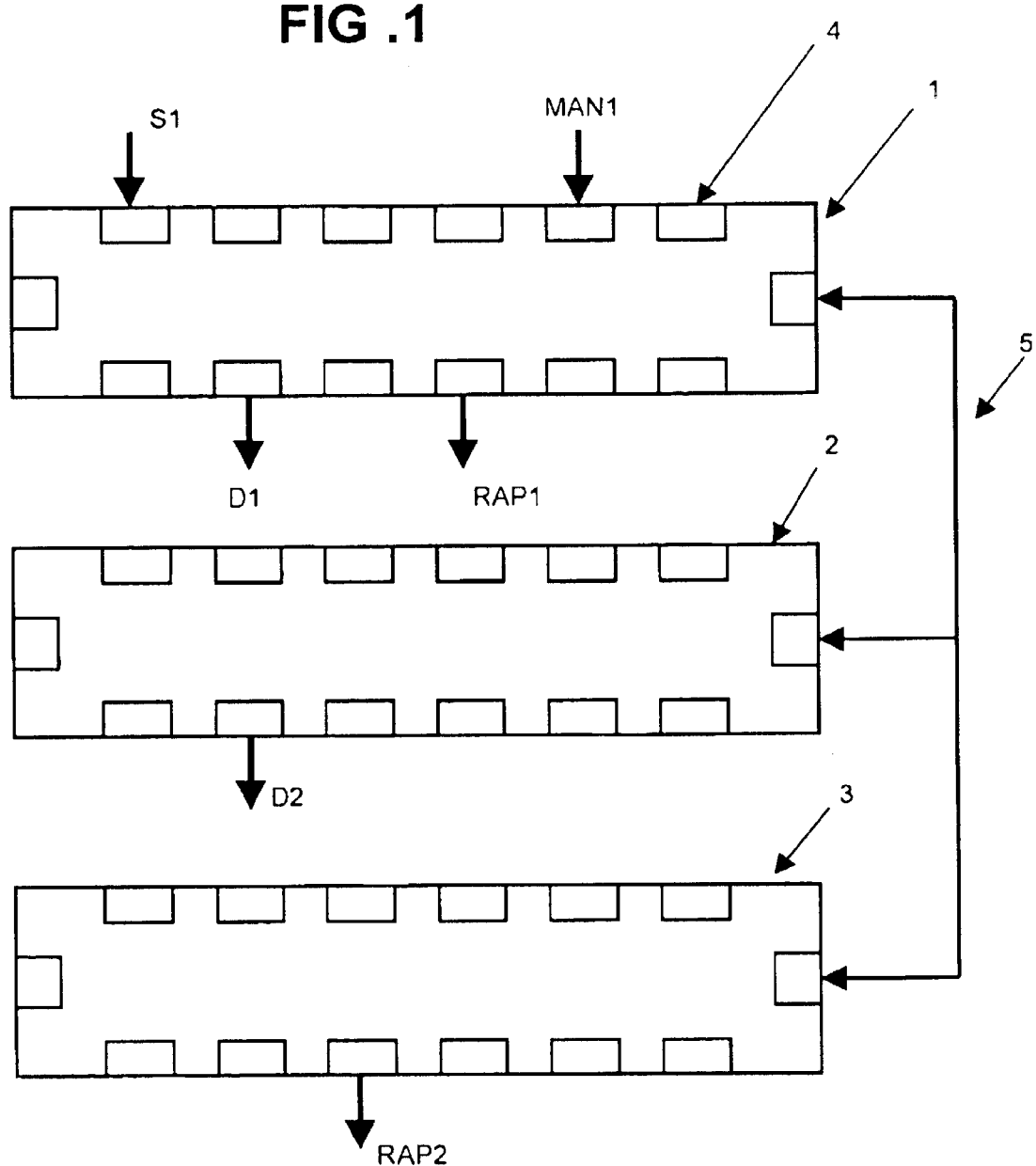
FIG. 1 is an explanatory diagram illustrating stacked units connected together by a simple cascade.
Figure 2:
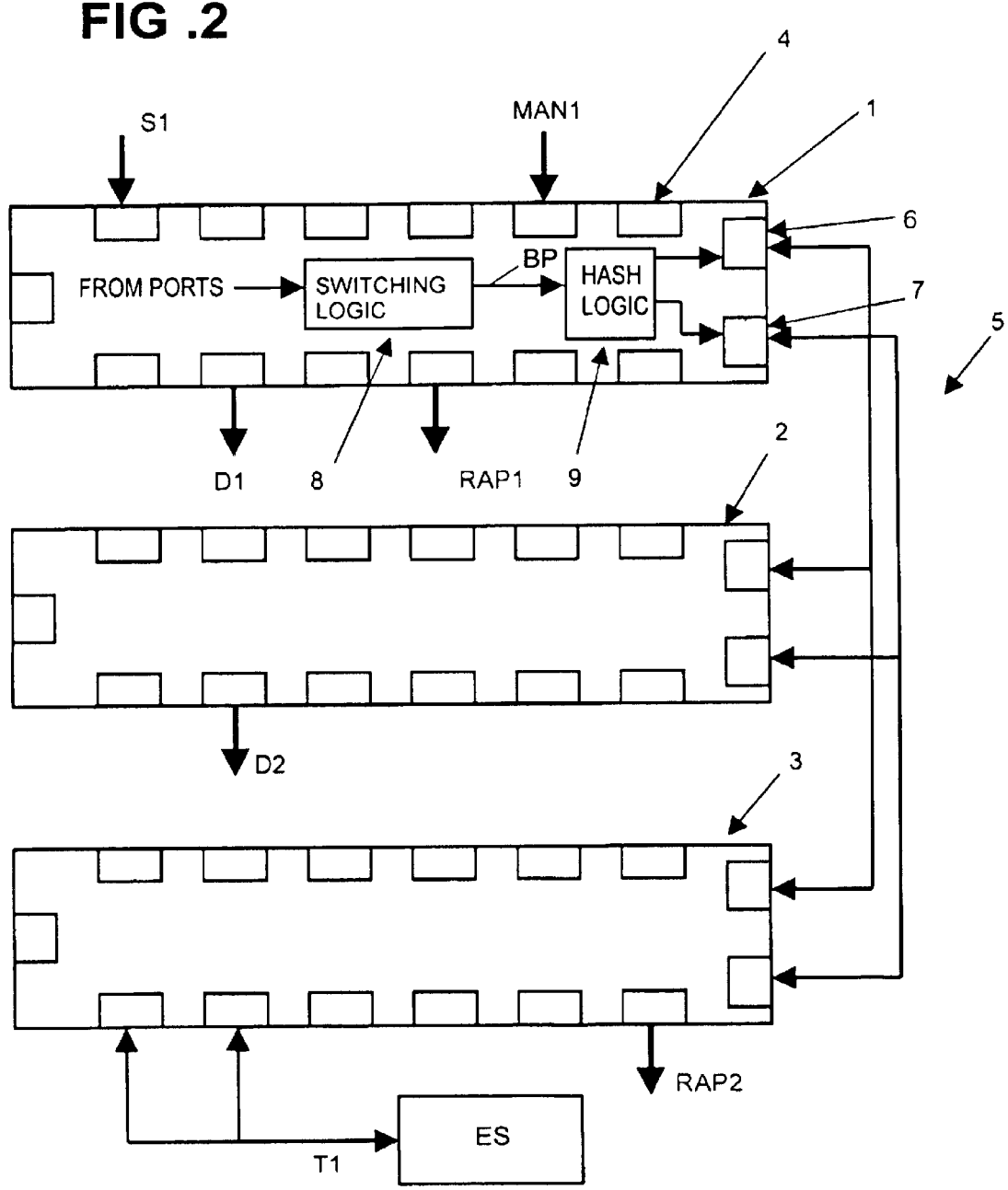
FIG. 2 is an explanatory diagram showing the stacked units connected together by a 'trunked' cascade.
Figure 3:
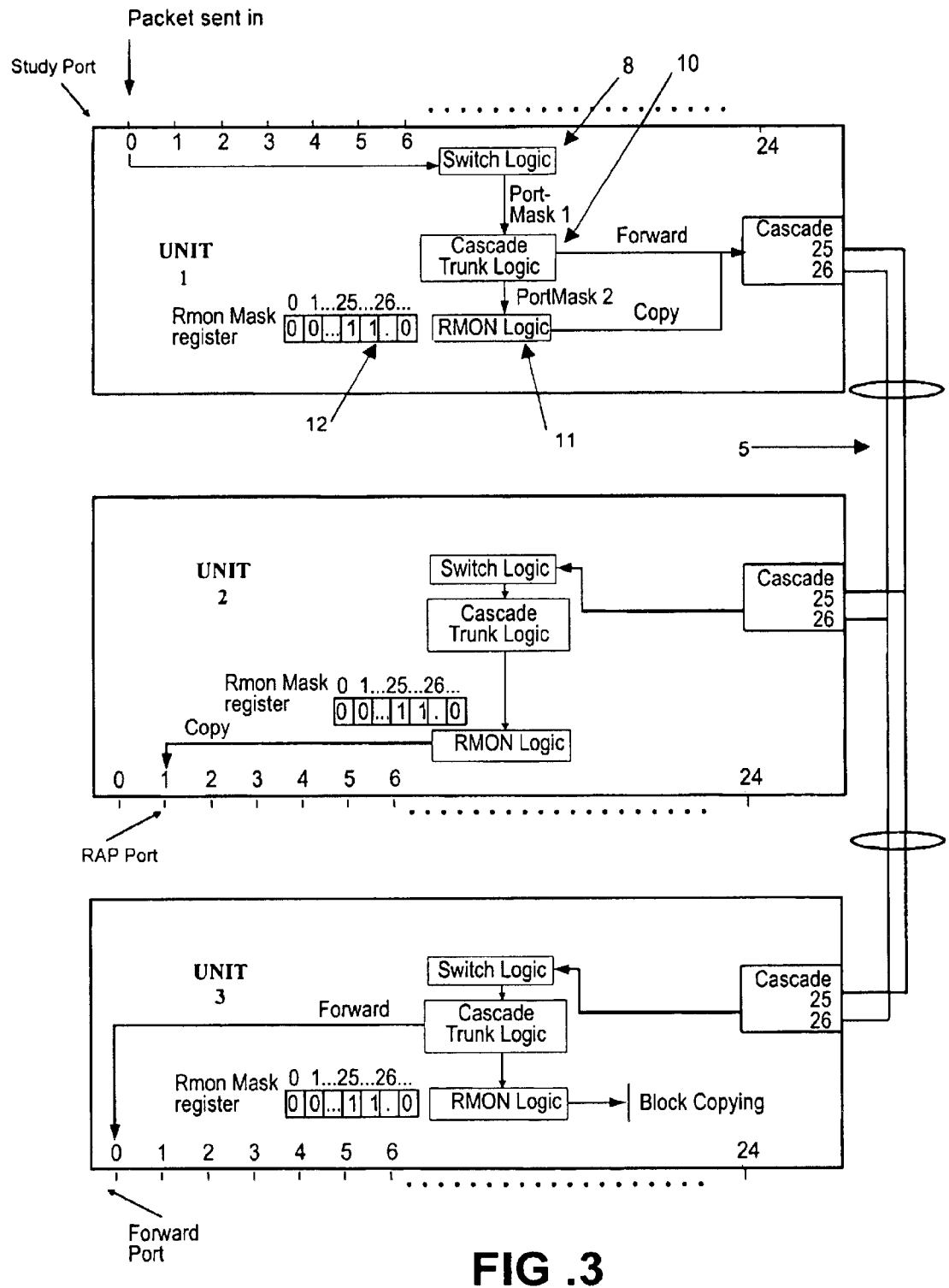
FIG. 3 is a more detailed diagram of a stack of units connected in accordance with the invention.

FIGS. 1 and 2 do not represent embodiments of the invention but are provided in order to assist the understanding of the various terms used in relation to FIG. 3.

In FIG. 1, the units 1, 2 and 3 represent multi-port communication devices each having a multiplicity of duplex ports, of which one is denoted at 4. The units 1, 2 and 3 may constitute a set of repeater units, bridge units, switch units or other types of network device. They are connected together by a cascade 5, which in FIG. 1 is a single path connection as far as each of the units 1, 2 and 3 is concerned, the cascade is included only one port on each of the devices 1, 2 and 3. The purpose of the cascade is to enable the units 1, 2 and 3 to act together as a single logical entity so that a packet entering, for example, any port of unit 1 can be forwarded from any of the ports on units 2 and 3.

FIG. 1 also illustrates diagrammatically the function known as port mirroring. In its simple form, packets arriving at or dispatched from a port on a particular device are copied, using known RMON logic, to another port. The first of these ports is known as the study port and the second is known as the copy or roving analysis port. In FIG. 1, for example, the arrow S1 indicates packets arriving at a particular port on unit 1 and being forwarded from another port denoted D1. The unit has a port designated as a roving analysis port RAP 1 and the RMON logic (not shown in FIG. 1) configures the switch so that all the packets arriving at (as well as preferably all the packets leaving) that port are copied to the port RAP 1. This feature facilitates networks management. For example, an external pack analyzer may be connected to the port RAP 1. If some operational fault is suspected in relation to a particular port, a network manager can configure the switch so that the port thought to be associated with the fault is the study port and all packets passing through that port will be copied to the RAP port and then to the analyzer. If at some time later a different port needs analysis, the network manager may once again reconfigure through software the new port to be the study port. This is much more convenient than the physical disconnection of the analyzer from one location and the reconnection to a port that needs to be analyzed. This configuration may be performed remotely by way of a 'management' port MAN1.

As technology has developed, the need to support this feature across a stack of communication devices linked by a cascade has become a standard requirement. This means, as shown in FIG. 1 also, that the study port (S1) may be on one unit while the roving analysis port may be on another. In FIG. 1 a roving analysis port RAP 2 is shown (arbitrarily) as a port on the unit 3. Thus packets intended for copying to the port RAP2 have to be provided within unit 1 with a port number identifying the port (the 'designated RAP port) from which the copied packet must be forwarded from unit 1 to reach (eventually) the RAP port RAP2 on unit 3.

It is known to 'flag' or 'tag' packets received at a unit containing the designated study port so that the unit which has the RAP port can copy the packets to the RAP port. Thus, if as shown in FIG. 1, the study port S1 is on unit 1 and the destination of a packet in port terms is port D2 on unit 2, the unit 1 will tag the packet before it is sent down the cascade 5. The packet will be received at unit 2 and (after appropriate look up) will be dispatched from port D2. However, unit 2 will ignore the RAP tag. The packet will also be received by unit 3 which will, by virtue of the RAP tag, forward the packet to the RAP port RAP2.

FIG. 2 illustrates a more complex form of stack. It also illustrates two forms of trunking for the sake of explanation. Trunking is employed to provide a manifold path between a multiplicity of ports and a source or destination in order to increase the bandwidth or storage capacity available for the transmission of the packets. FIG. 2 illustrate trunking in relation to an end station ES connected to two ports of the unit 3. These two ports are grouped together and all packets which are, for example, destined for the end station from unit 3 are dispatched from one or other of these ports. It is known to group ports in this manner and trunk them with the aid of a very high speed serial link connected to the end station. The process of trunking is useful where an individual port's storage capacity or bandwidth may be insufficient for bearing the traffic relevant to that port.

FIG. 2 also illustrates the trunking of the cascade connection between the devices 1, 2 and 3. The cascade connection is trunked with respect to each of the individual units and is connected to two ports on each of those units.

Once a group of trunked ports has been created, it is represented internally in the switch by a single 'logical' port known as the master port or bridge port of the trunk. This is shown in FIG. 2 by the line BP extending from the switch logic 8. The switch logic selects a destination port for packets received from any of the ports on switch 1. If a packet is intended for forwarding from one of the units 2 and 3 the switching logic identifies the port number in its look up table as the (logical) port 'BP'. Packets which may have a variety of destination addresses but intended for dispatch from units 2 and 3 , will all have a port number defined within switch 1 as 'BP'. In order to achieve the benefits of trunking, some of the ports need to be sent out on port 6 to the cascade and some on port 7. There exists a variety of schemes for achieving a fair or even distribution of the packets to ports 6 and 7. One is to hash the addresses or part of the addresses (preferably the destination addresses) in the packets. In a simple scheme, the hashing may comprise exclusive or operations on the bits of the destination address so that the destination addresses may be hashed either to a number identifying port 6 or to a number identifying port 7. More sophisticated schemes are possible but not relevant to the present invention. The hashing logic and consequential switching are denoted by the block 9.

Reference will now be made to FIG. 3 which is intended both to illustrate the problems which the invention is intended to solve and also to indicate the nature of the solutions.

In FIG. 3, the units 1, 2 and are as indicated in the previous Figures. Each has 'ordinary' ports 0 to 24 and two other ports, ports 25 and 26, which are connected to form a trunked cascade 12 linking the units together. It is assumed that the port 0 on unit 1 is the study port, whereas port 1 on unit 2 is the RAP port and a packet has to be forwarded from port 0 on unit 3.

Unit 1 (as do all the other units) contains switch logic 8, cascade trunk logic 10 and RMON logic 11. The switch logic, operating in customary manner, will forward the packet (of which the port mask is shown as Port Mask 1) to the 'bridge' port identified as BP (FIG. 2), and the cascade logic 10, including the hashing logic, will forward that packet out on either port 25 or port 26 in a manner beyond the control of the switch logic. However, the RMON logic 11 will designate only one of the physical ports 25 or 26 as the RAP port and is connected to the designated RAP port (i.e. not through the cascade trunking logic). In this example, the RMON logic designates port 25 as the RAP port.

Thus, the RMON logic will forward the packet to be copied to port 25. Packet duplication will occur if the hashing algorithm in the switch logic selects port 26 to forward the data packet. As shown in FIG. 3, the packet does not go through the two pieces of logic in parallel—it goes into the switch logic 8 first and then into the cascade trunk logic 10, before finally going into the RMON logic 11.

Packet duplication is avoided by using a programmable mask register 12 described herein as a RMON mask register. This register is located in the RMON logic. It is written to by software. In this example it provides one bit for each port on the respective unit. It signifies to the RMON logic all the ports that take a packet closer to the RAP port. So in this case (Unit 1 in FIG. 3), as ports 25 and 26 are trunked and so represent the same logical port, they both can forward packets to the RAP port and so both of their bits will be set in the mask. It turns out that the only time there is more than one bit set in this mask is when the path to the RAP port is through a trunk—in this case the path to the RAP port is through a cascade that is trunked.

Figure 4:
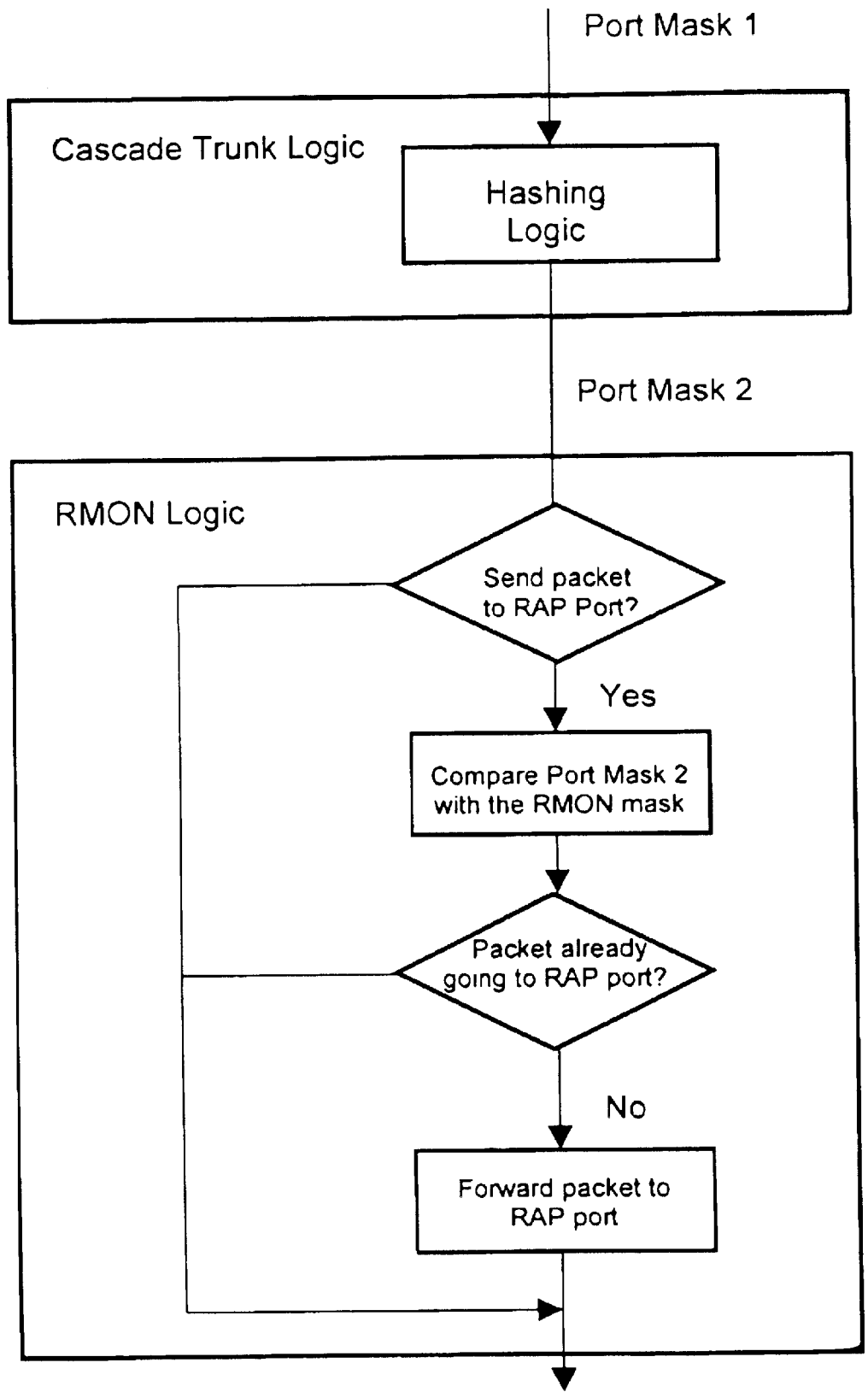
FIGS. 4 and 5 are flow diagrams of the process.

When the port mask (PortMask 2) from the cascade trunk logic is passed into the RMON logic, and the RMON logic decides that the packet should be forwarded to the RAP port, then it can detect by comparing this Port Mask 2 with the RMON Mask held in register 12 if the packet is already being forwarded to either of the ports that provide a path to the RAP port (in this case, ports 25 and 26). If the packet is being forwarded to either of these ports, then the RMON logic does not need to forward the packet itself. In the example, the packet is being forwarded anyway to either port 25 or 26 (depending on the hashing logic) because the destination port is on another unit. Therefore one of their bits will be set in Port Mask 2, the RMON logic will detect this and will not forward the packet itself. This prevention of the RMON logic from forwarding the packet, when it detects the packet is already on route there via one of the Trunk ports, avoids duplication of the packet. FIG. 4 is a flow diagram of the process.

A second problem arises when a unit contains neither the RAP nor the Study port. This situation is shown in relation to unit 3, which does not contain the RAP port or the study port but does contain the port from which the packet received at port 0 of unit 1 is to be normally forwarded. Packets coming along the cascade that are destined to be forwarded to the RAP port will be tagged to indicate so. The switching logic on Unit 3 will correctly forward the packet to port 4. However, the RMON logic will be notified from the RAP tag that the packet has been selected for copying to the RAP port and will attempt to forward the packet to the RAP port. If the packet (with the RAP tag) was received on port 25, the RMON logic notes that the source port and the RAP port are the same and so the packet does not need to be forwarded to the RAP port. If the packet was received on port 26, then the RAP port and source port do not match and the RMON logic would forward the packet to the RAP port. This means that the packet would be forwarded to the RAP port twice.

Figure 5:
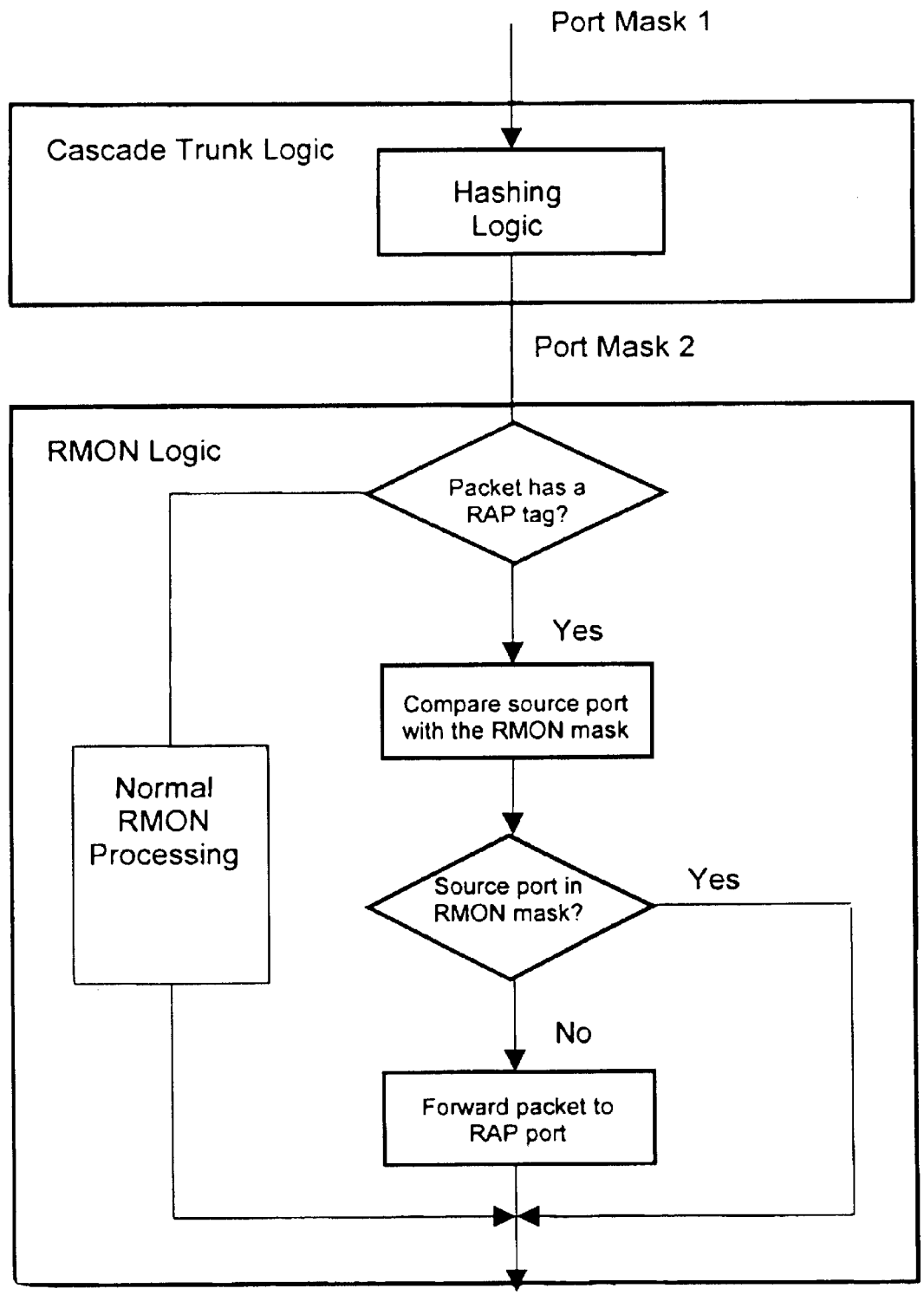

The RMON register will be used in this situation again to prevent this problem. When the packet is received on port 26 with a RAP tag, then the RMON logic will now compare the source port with the RMON mask—if the source port's bit is set in the RMON mask then the packet is already being forwarded to the RAP port. In effect, if the packet received has a RAP tag and the source port is in the RMON mask, then the RMON logic will block the packet from being forwarded to the RAP port. If the source port is not in the RMON mask, the RMON logic will forward the packet to the RAP port. FIG. 5 is a flow-diagram of the process.

In the foregoing example there are two trunked ports (25 and 26) on a unit but the invention is readily extensible to a greater plurality of trunked ports.

What is claimed is:

1. A stackable multi-port communication unit for a packet-based data communication system and having a multiplicity of physical ports for the reception and dispatch of data in the form of packets, the unit including:

switch logic for selecting for a packet at least one destination selected from a multiplicity of ports which include a logical port common to a specified group of said physical ports;

cascade trunk logic, coupled to said switch logic, for determining, for the dispatch of a packet directed to said logical port, a selected port of said group of said physical ports; and monitoring logic for forwarding a copy of the packet;

wherein said monitoring logic stores an indication of all the physical ports on the unit from which said copy can be forwarded by the monitoring logic and prevents the forwarding of said copy of the packet when any of those physical ports corresponds to the port selected by the cascade logic for the dispatch of said packet, whereby a packet which is forwarded from any of said specified group of physical ports is not duplicated by the monitoring logic.

2. A unit as in claim 1 wherein said monitoring logic includes a mask register having a field for each physical port from which packets can be forwarded from the unit.

3. A unit as in claim 2 wherein each field is a one-bit field.

4. A unit as in claim 2 wherein said cascade trunk logic provides said packet with a port mask identifying said selected port and said monitoring logic compares the port mask with the contents of said mask register.

5. A unit as in claim 1 wherein said cascade trunk logic responds to a packet directed to said logical port and selects said selected physical port from said specified group by hashing address data in said packet.

6. A unit as in claim 1 wherein the monitoring logic prevents the forwarding of a copy of a packet received at any of said group of ports when said indication includes said group.

7. A stackable multi-port communication unit for a packet-based data communication system and having a multiplicity of physical ports for the reception and dispatch of data in the form of packets, said physical ports including a group of at least two trunked ports for sending packets on a cascade connection to other units, wherein said unit includes:

switch logic for selecting for a packet at least one destination selected from a multiplicity of ports which include an internal logical port common to said group of trunked ports;

cascade trunk logic, coupled to said switch logic and disposed between said logical port and said group of trunked ports, for determining, for the dispatch of a packet directed to said logical port, a selected port of said group of trunked ports; and monitoring logic, coupled to said cascade trunk logic and said trunked ports for forwarding a copy of said packet;

wherein said monitoring logic prevents the forwarding of said copy of said packet to any of said trunked ports when any of said trunked ports is selected by the cascade logic for the dispatch of said packet, whereby a packet which is forwarded from any of said trunked ports is not duplicated by said monitoring logic.

8. A unit as in claim 7 and including a mask register having a field for each physical port from which packets can be forwarded from the unit by the monitoring logic;

wherein said cascade trunk logic provides said packet with a port mask identifying said selected trunked port and said monitoring logic compares the port mask with the contents of said register.

9. A unit as in claim 7 wherein said cascade trunk logic responds to a packet directed to said logical port and selects a trunked port from said group by hashing address data in said packet.

10. A stackable multi-port communication unit for a packet-based data communication system and having a multiplicity of physical ports for the reception and dispatch of data in the form of packets, said physical ports including at least two trunked ports for sending packets on a cascade connection to other units, wherein said unit includes:

switch logic for selecting for a packet at least one destination selected from a multiplicity of ports which include a logical port common to said trunked ports;

cascade trunk logic, coupled to said switch logic and disposed between said logical port and said group of trunked ports, for determining, for the dispatch of a packet directed to said logical port, a selected port of said group of trunked ports; and monitoring logic for making a copy of a packet received at one of said multiplicity of physical ports and forwarding said copy for use by a monitoring port;

wherein said monitoring logic includes a programmable register for storing an indication of any port from which said copy can be forwarded from said unit in order to reach said monitoring port and has recourse to said indication to prevent the forwarding of said copy of said packet to any of said trunked ports when any of said trunked ports is selected by the cascade logic for the dispatch of said packet, whereby a packet which is forwarded from any of said trunked ports is not duplicated by the copy made by said monitoring logic.

11. A unit as in claim 10 wherein said programmable register includes a mask register having a field for each physical port from which packets can be forwarded from the unit by the monitoring logic; and wherein said cascade trunk logic provides said packet with a port mask identifying said selected trunked port and said monitoring logic compares the port mask with the contents of said programmable register.

12. A stackable multi-port communication unit for a packet-based data communication system and having a multiplicity of physical ports for the reception and dispatch of data in the form of packets, the unit including:

switch logic for selecting for a packet at least one destination selected from a multiplicity of ports which include a logical port common to a trunked group of said physical ports;

trunk logic, coupled to said switch logic, for determining, for the dispatch of a packet directed to said logical port, a selected port of said trunked group of said physical ports; and monitoring logic for making and forwarding a copy of the packet; and wherein:

said switch logic provides for said packet a first port bit mask which includes a field for said internal logical port;

said trunk logic provides for said packet, when said first bit mask indicates said internal logical port for the forwarding of said packet, a second bit mask which indicates any one of said group of trunked ports for the dispatch of said packet;

said monitoring logic stores an indication of all the physical ports on the unit from which said copy can be forwarded by the monitoring logic and by comparison of said indication with said second bit mask prevents the forwarding of said copy of the packet when any of those physical ports corresponds to the port selected by the trunk logic for the dispatch of said packet.

13. A unit as in claim 12, wherein the monitoring logic prevents the forwarding of a copy of a packet received at any of said group of trunked ports when said indication includes said group of trunked ports.

* * * * *